E. H. HUTTON.
CORN PLANTER.
APPLICATION FILED JAN. 16, 1914.

1,115,544.

Patented Nov. 3, 1914.
4 SHEETS—SHEET 1.

Witnesses

Inventor
E. H. Hutton
By
Attorneys

E. H. HUTTON.
CORN PLANTER.
APPLICATION FILED JAN. 16, 1914.

1,115,544.

Patented Nov. 3, 1914.
4 SHEETS—SHEET 4.

Witnesses

Inventor
E. H. Hutton
By
Attorneys

UNITED STATES PATENT OFFICE.

EUGENE HAROLD HUTTON, OF CHARLESTON, ILLINOIS.

CORN-PLANTER.

1,115,544.  Specification of Letters Patent.  Patented Nov. 3, 1914.

Application filed January 16, 1914. Serial No. 812,485.

*To all whom it may concern:*

Be it known that I, EUGENE HAROLD HUTTON, a citizen of the United States, residing at Charleston, in the county of Coles, State of Illinois, have invented certain new and useful Improvements in Corn-Planters; and I do hereby declare the following to be a full, clear, and exact description of the invention, such as will enable others skilled in the art to which it appertains to make and use the same.

This invention relates to corn planters.

The object of the invention resides in the provision of a corn planter which embodies improved mechanism for intermittently dropping the seed in check row and means operated by said mechanism for marking the point at which the seed is dropped.

A further object of the invention resides in the provision of means for manually adjusting the mechanism for dropping the seed so that such mechanism may be set with facility, when the seed is being dropped out of line, to restore the proper operation of the mechanism.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1:
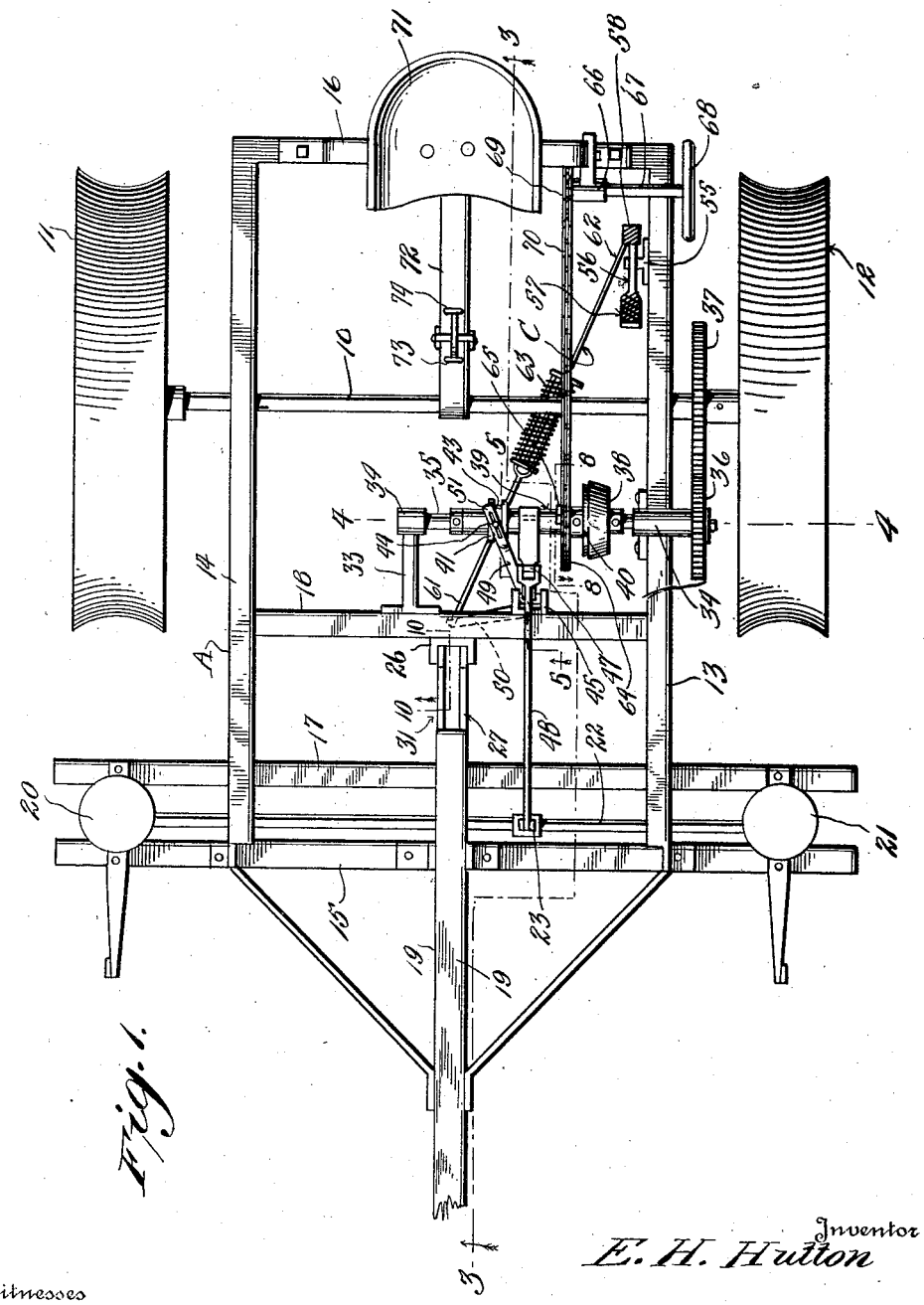
Figure 2:
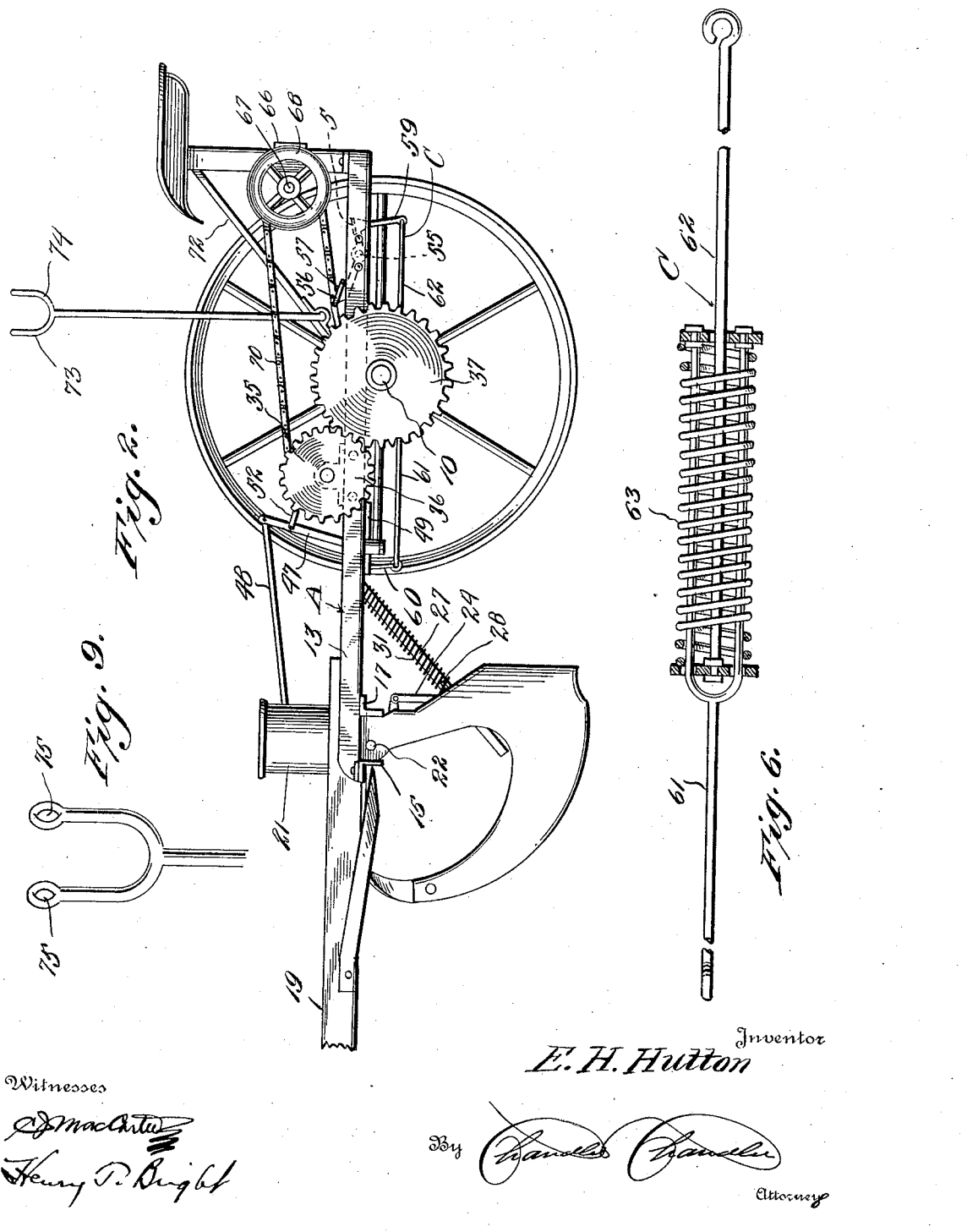
Figure 3:
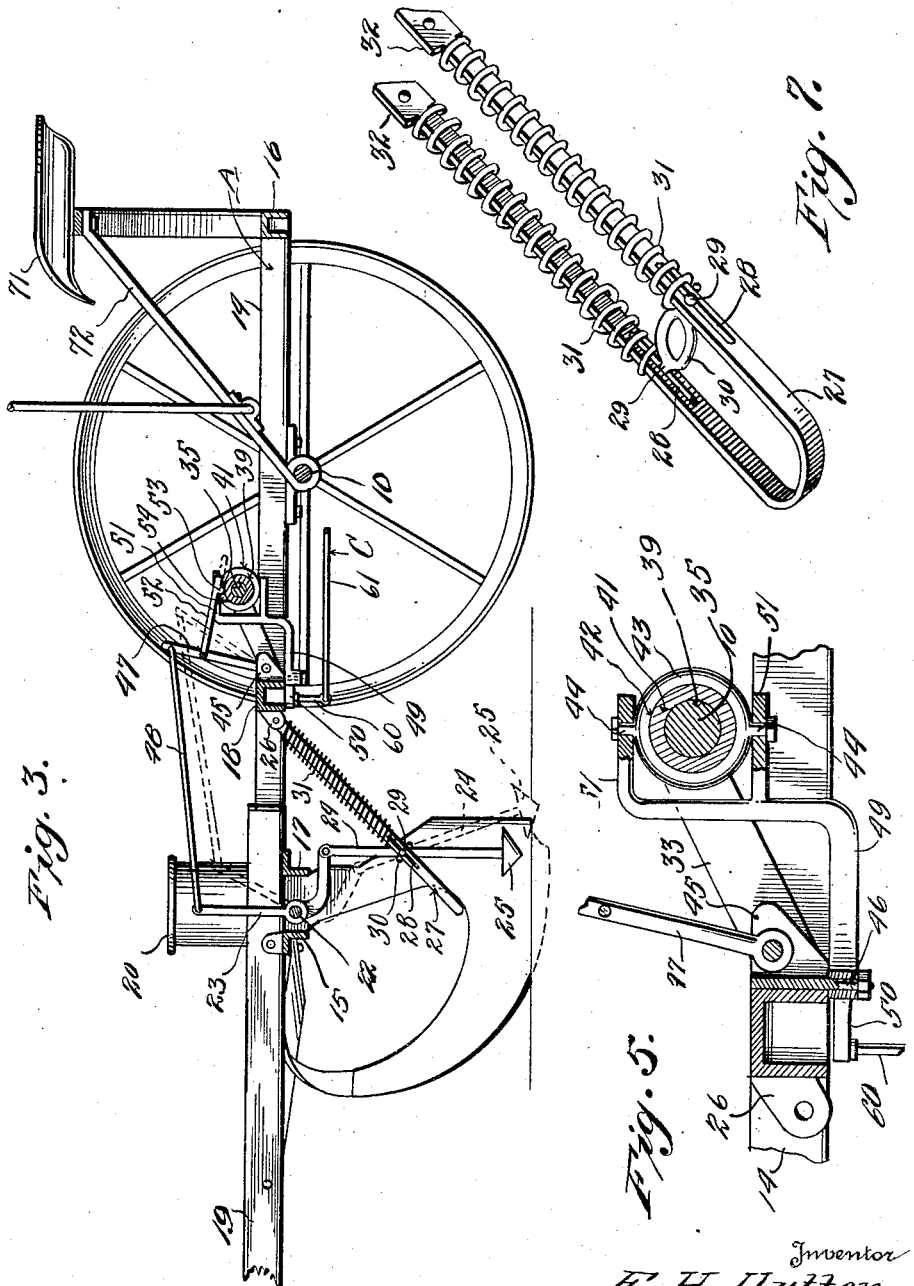
Figure 4:
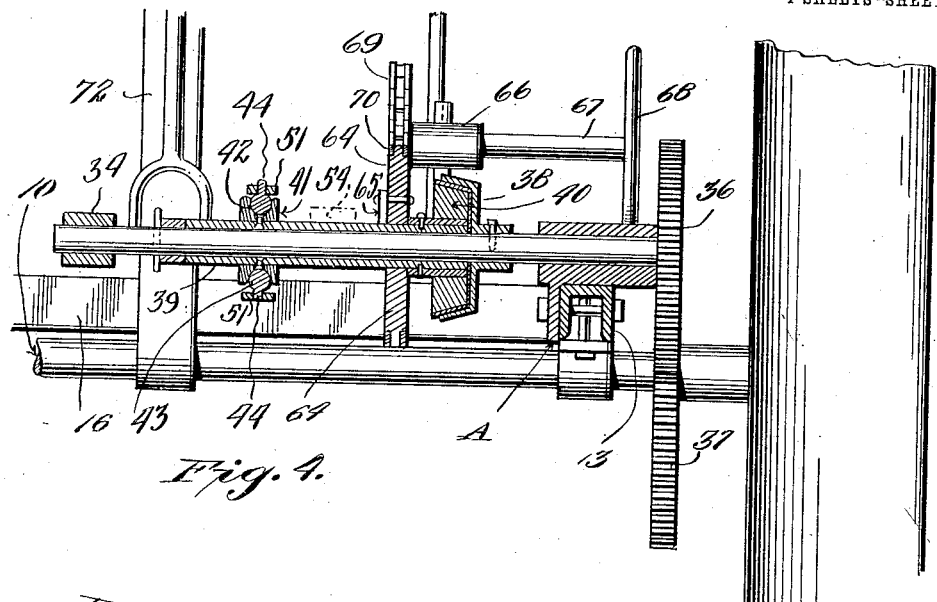
Figures 8, 11:
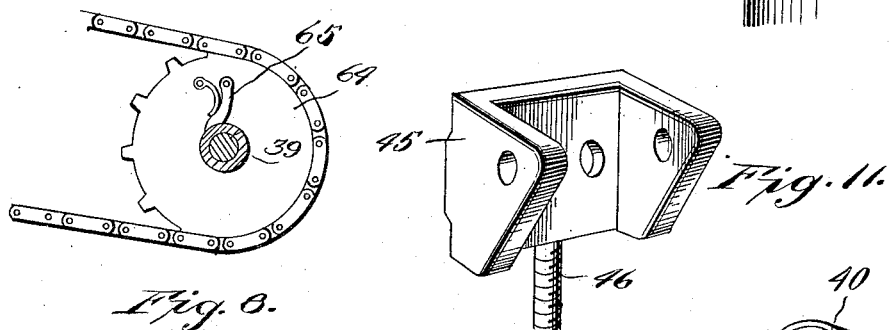
Figure 10:
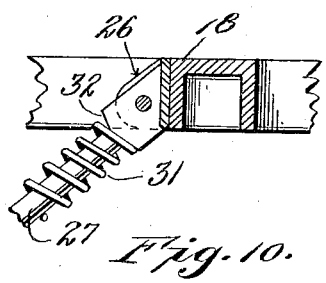
Figure 12:
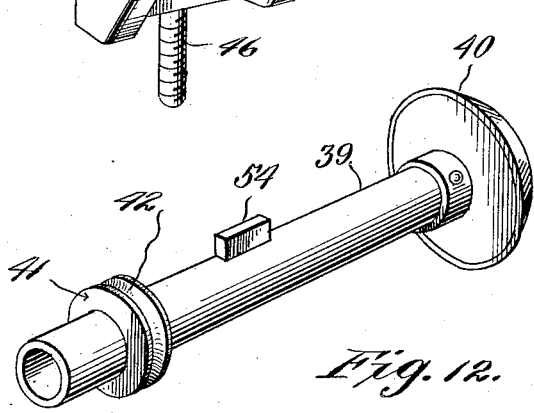

Figure 1 is a plan view of a corn planter constructed in accordance with the invention; Fig. 2, a side view of what is shown in Fig. 1 with the near traction wheel removed; Fig. 3, a section on the line 3—3 of Fig. 1; Fig. 4, an enlarged section on the line 4—4 of Fig. 1; Fig. 5, an enlarged section on the line 5—5 of Fig. 1; Fig. 6, a detail view of the connection between the clutch lever and the foot pedal; Fig. 7, a detail view of the yielding guide for the marker and the support for said guide; Fig. 8, a section on the line 8—8 of Fig. 1 on an enlarged scale; Fig. 9, a perspective view of the upper end of the sight employed in the machine; Fig. 10, a section on the line 10—10 of Fig. 1; Fig. 11, a detail perspective view of the clutch lever bracket, and Fig. 12, a detail perspective view of the sleeve which carries the tripping lug.

Referring to the drawings the improved corn planter is shown as comprising a frame A supported upon a wheeled axle 10. A wheel 11 is loosely mounted on one end of said axle, while a wheel 12 is fixed on the other end of the axle. The frame A embodies side members 13 and 14, a front cross member 15, a rear cross member 16 and intermediate cross members 17 and 18. Supported upon the cross members 15 and 17 is the inner end of a draft tongue 19. The ends of the cross members 15 and 17 are extended beyond the side members 13 and 14 and have mounted thereon in line with the wheels 11 and 12 seed hoppers 20 and 21 respectively. These hoppers 20 and 21 carry in their lower portions the usual normally closed valve mechanisms (not shown) which valve mechanisms are adapted to be opened intermittently by oscillation of a shaft 22 which is operatively connected at its ends to said mechanisms respectively.

Fixed on the shaft 22 is a two arm lever 23 which has pivoted to its lower end a marker stem 24 carrying a marker 25. Secured to the cross member 18 is a bracket 26 and attached to this bracket is a U-shaped member 27 having corresponding slots 28 in the arms thereof. Slidable in the slots 28 respectively are projections 29 formed on an eye member 30 and through which eye member the marker stem 24 is adapted to slide. Surrounding the arms of the member 27 respectively are springs 31 which bear at one end against the eye member 30 and at their other ends against shoulders 32 formed on respective arms of the member 27.

Projecting rearwardly from the cross member 18 is a bearing 33 which alines with a bearing 34 mounted upon the side member 13. Journaled in the bearings 33 and 34 is a shaft 35 which has fixed on the end thereof adjacent the side member 13 a gear 36 which meshes with a gear 37 fixed on the axle 10. Fixed on the shaft 35 just inwardly of the side member 13 is the female member 38 of a cone clutch. Loose upon the shaft 35 is a sleeve 39 which has fixed thereon a cone clutch male member 40 adapted for coöperation with the female member 38 to lock the sleeve 39 upon the shaft 35. Fixed upon the end of the sleeve 35 remote from the clutch member 40 is a collar 41 provided with a circumscribing groove 42 in which is rotatably mounted a ring 43 having diametrically opposite studs 44 formed integral therewith.

Mounted upon the cross member 18 on the side of the latter opposite to the bracket 26 is a bracket 45 from which depends a finger 46. Pivoted on the bracket 45 for movement in a vertical plane is an arm 47 the free end of which is connected to the upper end of the lever 23 by means of a link 48.

Pivoted on the finger 46 for movement in a horizontal plane is an angle lever including arms 49 and 50. The free end of the arm 49 is directed upwardly and provided with lateral extensions 51 through which the studs 44 are respectively engaged, and whereby the pivotal movement of said angle lever will serve to slide the sleeve 39 and throw the clutch members 38 and 40 into and out of operative relation.

Pivoted to the arm 47 is a rearwardly extending arm 52 the free end of which is provided with a lug 53 adapted to coöperate with a lug 54 fixed on the sleeve 39 during the rotation of said sleeve. Fixed on the side member 13 is a stud 55 upon which is pivoted a pedal 56 having toe and heel portions 57 and 58 respectively. Depending from the heel portion 58 is an arm 59 which is connected to an arm 60 depending from the arm 50 of the angle lever by means of a link C. This link is formed of sections 61 and 62 having sliding engagement with each other and normally held with their adjacent ends in the greatest overlapping relation by means of a spring 63.

Owing to the action of the spring 63 on the sections 61 and 62 the angle lever including the arms 49 and 50 will be normally held in position to dispose the clutch members 40 and 38 in operative relation so that as the machine is moved along the ground the shaft 35 and sleeve 39 will be rotated. During this rotation of the sleeve 39 the lug 54 will intermittently engage the lug 53 and draw the arm 47 rearwardly. This movement of the arm 47 will in turn draw the upper end of the lever 23 rearwardly and rotate the shaft 22 to effect the operation of the dropping mechanisms carried by the hoppers 20 and 21. As soon as the lug 54 passes out of engagement with the lug 53 the arm 52, arm 47, lever 23 and shaft 22 will be returned to their normal positions by a spring employed in the usual seed dropping mechanism. When the upper end of the lever 23 is moved rearwardly the marker 25 will be forced into the ground. Should the marker engage an obstruction the eye member 30 will yield and obviate the possibility of damage. If it is desired to disengage the clutch members 40 and 38 it is only necessary to push downwardly on the heel portion 57 of the pedal 56 as will be obvious.

Loosely mounted on the sleeve 39 is a sprocket wheel 64 which carries a friction pawl 65 adapted to coöperate with the sleeve 39 when said sprocket wheel is rotated in one direction. Mounted on the rear cross member 16 is a bearing 66 in which is journaled a shaft 67. Fixed on the outer end of this shaft 57 is a hand wheel 68, while a sprocket wheel 69 is fixed on the inner end of said shaft in line with the sprocket wheel 64. Traveling on the sprocket wheels 64 and 69 is a sprocket chain 70. By this construction it will be apparent that when the sleeve 39 is rotated during the normal operation of the machine it will be without effect upon the sprocket wheel 64. On the other hand when the machine is idle rotation of the sprocket wheel 64 to the left in Fig. 8 will rotate the sleeve 39 through the medium of the pawl 65, such rotation of the sprocket wheel 64 being accomplished through the medium of the manual rotation of the wheel 68. The rotation of the sleeve 39 just referred to is resorted to when it is desired to change the time of the next operation of the seed dropping mechanism.

Supported upon the rear cross member 16 is an operator's seat 71 and mounted upon a brace 72 in front of the operator's seat is a sight embodying a rod having a forked upper end including arms 73 and 74 provided with sight openings 75 respectively.

What is claimed is:—

In a corn planter, the combination of a wheeled frame, a seed dropping mechanism mounted on the frame and including a shaft, an arm pivoted on the frame, connections between said arm and the shaft whereby the movement of the former will oscillate the shaft to effect the operation of the seed dropping mechanism, a second shaft journaled on the frame, a sleeve loose on the second shaft, a lug on said sleeve, means for connecting said sleeve to the second shaft, a second arm pivoted to the first named arm, a lug on the second arm adapted to be engaged by the lug on the sleeve during the rotation of the latter to effect movement of the pivoted arm to operate the seed dropping mechanism, and means for rotating the second shaft.

In testimony whereof, I affix my signature, in the presence of two witnesses.

EUGENE HAROLD HUTTON.

Witnesses:
HORACE McINTYRE,
JOHN A. HUTTON.